Feb. 15, 1927.
G. C. FEDDERMAN
1,617,582
HOLDDOWN DEVICE FOR AUTOMOBILES
Original Filed May 6, 1924
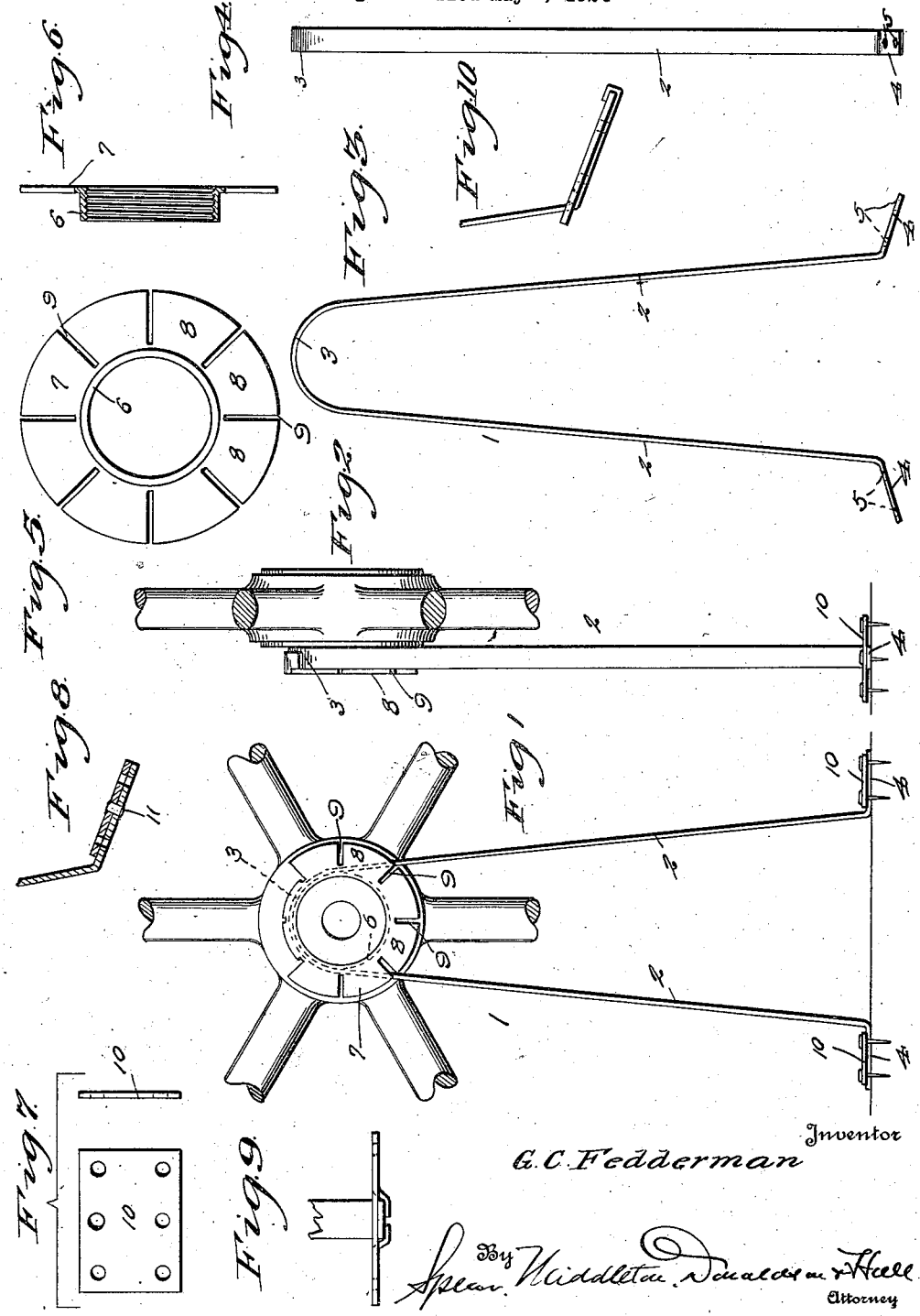
Inventor
G. C. Fedderman Patented Feb. 15, 1927.

1,617,582

UNITED STATES PATENT OFFICE.

GEORGE C. FEDDERMAN, OF DETROIT, MICHIGAN, ASSIGNOR TO AUTO LOADING DEVICE MANUFACTURING COMPANY, OF DETROIT, MICHIGAN, A CORPORATION OF MICHIGAN.

HOLDDOWN DEVICE FOR AUTOMOBILES.

Application filed May 6, 1924, Serial No. 711,452. Renewed May 6, 1926.

The invention is designed for holding down an automobile to the floor of a freight car and it is intended for use by taking off the hub cap belonging to the car and substituting in its place a member forming a part of the present improvement and serving as a means of retaining the hold down in place.

In the drawings:

Figure 1 is a front view of part of an automobile wheel with my improved holddown appliance in place.

Fig. 2 is a side view of Fig. 1.

Fig. 3 is a view of one member of the hold down device.

Fig. 4 is a view of Fig. 3 a quarter turn therefrom.

Fig. 5 is a front view of the means for attaching the hold down strap to the hub of the car.

Fig. 6 is a sectional view of Fig. 5.

Fig. 7 is a view of an attaching plate.

Figures 8, 9, and 10 show different ways of combining a hold down plate with the strap.

In these drawings 1 indicates a comparatively thin strap of metal having side legs 2 and a curved or arched connecting portion 3. The legs have feet 4 provided each with a pair of nail openings 5. These feet normally extend as shown in Fig. 3 downwardly and outwardly at an inclination to the main portion of the hold down, so that when first placed in position only the extreme ends of the foot portions will bear on the floor. These foot portions are secured by nailing them to the floor, the nail nearest the end of the foot being driven first and thereafter the second nail is driven by inserting it through the opening nearest the high part of the foot. This nailing operation will bring the foot down from its inclined position as shown in Fig. 3 to the substantially right angular relation in respect to the main body shown in Fig. 1, so that the foot will bear on the floor throughout the area of its lower face and any slack or looseness in the fit of the arch portion of the hold down in respect to the part it is to engage will be taken up and the strap will be drawn tightly into place.

For holding this strap to the hub of the wheel, the ordinary hub cap is removed and the device shown in Figs. 5 and 6 is screwed onto the hub. This member is formed of comparatively thin metal. It has a cylindrical portion 6 to afford a seat for the arched portion of the hold down strap which engages therewith as shown in Figs. 1 and 2, and it also has the flange 7 which is split into sections 8 by the radial slits 9. When the attaching device is screwed onto the hub, in place of the ordinary cap, and the strap is in place, the flange 7 will lie on the outer side of the hold down device or strap, and will afford a retaining wall to prevent the strap from slipping off, and to better insure this result the two uppermost sections 8 of the fastening device are bent down over that portion of the strap which is seated on the cylindrical portions of the attaching device.

The strap is of thin metal, strong enough to prevent undue rise of the automobile in response to vibrations of the car. It does not serve as a support. If the tire deflates and the wheel lowers, the strap will bend, but it will not become dislodged from the flanged attaching means because the sections 8 are bent down over the strap. There are enough of these sections that no matter to what position the attaching device is turned, there will be one of them, so situated as to clamp the strap when bent down.

A plate 10 having nail holes as shown in Fig. 7 is used to hold the foot of the strap to the floor. This has a central pair of nail holes corresponding to the nail holes in the foot, and it has a pair of nail holes at each end.

As shown in Figs. 8, 9 and 10 the reinforcing foot plate may be secured to the bent lower end of the hold down. In attaching the plate it is riveted thereto as at 11, the plate being on the upper side of the foot of the loop member, so that the full holding power of the plate will be effective, or the plate and foot may be attached in other ways, as by striking a pair of tongues as shown in Fig. 9 from the plate to embrace the underlying foot, or by passing the foot through an opening in the plate to lie along its under side and with its end turned up and over the edge of the plate, as shown in Fig. 10.

The hold down device may be used without the hub cap member in which event it would be used over the axle or over the spring or other part.

When used as above described with the member threaded onto the hub, the hold down is held in place and it in turn holds the screw cap from working off from the hub so that a secure fastening is obtained.

I do not limit myself to strap metal as the material of which the hold-down is composed.

Certain features disclosed herein relating to the hold down strap per se form the subject of a co-pending application filed May 6, 1924, Serial No. 711,451.

I claim:

1. A hold down for automobiles and the like consisting of a strap of metal having side legs and a connecting portion at their upper ends and a screw threaded member to be screw threaded onto the hub in place of the ordinary cap, said member having a seat to receive the upper portion of the strap, and means to attach the strap to said member after said member has been screwed into place.

2. A hold down for automobiles and the like consisting of a strap of metal having side legs and a connecting portion at their upper ends, and a screw threaded member to be screw threaded onto the hub in place of the ordinary cap, said member having a seat to receive the upper portion of the strap, said member having a projecting portion to be bent down over the upper part of the strap to hold the strap in place, and also prevent the turning of said member.

3. A hold down for automobiles and the like consisting of a strap of metal formed with an arch portion and side legs, and a screw threaded member to screw onto the hub in place of the ordinary cap, said member having a cylindrical portion and a flange at the outer side of the strap to retain the strap on the cylindrical portion, said flange being split into sections, one or more of which is bent down over the strap to retain it on said cylindrical portion, substantially as described.

In testimony whereof, I affix my signature.

GEORGE C. FEDDERMAN.